United States Patent [19]
Arai et al.

[11] Patent Number: 5,149,492
[45] Date of Patent: Sep. 22, 1992

[54] REACTOR CONTAINMENT VESSEL

[75] Inventors: Kenji Arai; Hirohide Oikawa; Hideo Nagasaka, all of Yokohama, Japan

[73] Assignee: Kabushiki Kaisha Toshiba, Kawasaki, Japan

[21] Appl. No.: 732,237

[22] Filed: Jul. 18, 1991

[30] Foreign Application Priority Data

Jan. 30, 1991 [JP] Japan .................................. 3-10246

[51] Int. Cl.⁵ ............................................ G21C 15/18
[52] U.S. Cl. ..................................... 376/283; 376/299
[58] Field of Search ............... 376/283, 299, 298, 293

[56] References Cited

U.S. PATENT DOCUMENTS 5,082,619  1/1992  Sawyer .............................. 376/283
5,091,144  2/1992  Dillmann et al. ................... 376/283

OTHER PUBLICATIONS

McCandless, R. J. et al., "Simplicity: the key to improved safety, performance and economics," Nuclear Engineering International, Nov., 1989.
Rao, A. S. et al., "SBWR Thermal Hydraulic Performance Analyses and Testing," Fifth Proc. of Nuclear Thermal Hydraulics, ANS Winter Meeting, Nov., 1989.
Otonari, J., Arai, K., et al., "Evaluation of Passive Containment Cooling System Performance for Simplified BWR," Fifth Proc. of Nuclear Thermal Hydraulics, ANS Winter Meeting, Nov., 1989.

Primary Examiner—Daniel D. Wasil
Attorney, Agent, or Firm—Oblon, Spivak, McClelland, Maier & Neustadt

[57] ABSTRACT

A reactor containment vessel with a cooling system includes a communication pipe having a valve to be connected to either an emergency condenser or suppression chamber in order to improve cooling performance by removing non-condensable gas from heat exchanger tubes when a main steam line is broken. One open end of the communication pipe is opened and positioned at a low position of the dry well. The valve is constantly closed and actuated to be opened in an abnormal condition of a reactor. When the valve is opened, the communication pipe introduces the non-condensable gas existing in the emergency condenser or suppression chamber to the low area of the dry well due to a density differential between steam and non-condensable gas, thus removing the non-condensable gas from the heat exchanger tubes, and improving the cooling performance of the emergency condenser.

10 Claims, 6 Drawing Sheets

REACTOR CONTAINMENT VESSEL

BACKGROUND OF THE INVENTION

The present invention relates to a reactor containment vessel of a nuclear power plant and more particularly to improvements relating to a cooling system of the nuclear power plant to remove decay heat in the case of breaking of tubes or the like on an accident.

If an accident happens in a reactor by any possibility, it is necessrary to remove decay heat by means of cooling a reactor. In reactor containment vessels there have been proposed various kinds of cooling systems for removing the decay heat. For example, it is known that a suppression chamber and isolation condenser (emergency condenser) are respectively provided as a cooling system without using dynamic device like a pump. The reactor containment vessel is generally composed of a drywell and a wetwell, and the suppression chamber is provided in the wetwell to communicate with a drywell through a suppression vent pipe wherein pool water is charged. The isolation condenser is connected to a main steam line extending from the reactor pressure vessel to remove decay heat from steam introduced therein. The provision of such a system makes cooling operation of the nuclear power plant reliable.

If an accident happens in the reactor, for example, in the case of the loss of coolant accident (LOCA), the decay heat produces steam in the reactor pressure vessel. The steam is introduced into the isolation condenser through the main steam line. The introduced steam is condensed in the isolation condenser and returned to the reactor pressure vessel as condensate by gravity.

When the main steam line is broken in the drywell, the steam produced by the decay heat is released into the drywell from the reactor pressure vessel through the broken main steam line. Then non-condensable gas charged in the drywell is mixed with the steam and introduced into heat exchanger tubes of the isolation condenser. Such an invasion of non-condensable gas causes the heat-exchanging performance of the heat exchanger tubes to deteriorate.

To cope with these problems, in the above-mentioned conventional structure, the isolation condenser is provided with a non-condensable gas vent pipe which vents the non-condensable gas in the heat exchanger tubes to the suppression chamber.

However, if the pressure in the drywell becomes almost equal to that in the suppression chamber, the end of the non-condensable gas vent pipe is sealed by the suppression pool water and the non-condensable gas vent pipe stops venting the non-condensable gas to the suppression chamber.

However, if residual non-condensable gas exists even a little in the heat exchanger tubes, the existance of such non-condensable gas causes condensation heat transfer to deterioate. It is known by experiment that when the non-condensable gas is 10% at mass rate to the steam, the condensation heat transfer degrades at about 20% as compared with the case without non-condensable gas. Accordingly, to prevent the degradation of heat transfer characteristics in the isolation condenser, it is desirable that non-condensable gas should be excluded from the heat exchanger tubes as much as possible.

SUMMARY OF THE INVENTION

An object of the present invention is to substantially eliminate defects or drawbacks encountered in the prior art and to provide an improved reactor containment vessel for preventing non-condensable gas from invading into an isolation condenser and an improved isolation condenser for promoting the non-condensable gas to be vented from the isolation condenser heat exchanger so as to remove decay heat efficiently when a main steam line is broken.

This object can be achieved according to the present invention, by providing one opening of a suppression vent pipe at a substantially corresponding level to a main steam line with providing of a communication pipe for introducing non-condensable gas toward a lower area of a drywell and providing a non-condesable gas vent pipe of an isolation condenser toward the lower area of the drywell, which branches from a non-condensable gas vent pipe of the isolation condenser toward a suppression chamber.

According to the reactor containment vessel of the structure or character described above, in the case of breaking of the main steam line, non-condensable gas in the vicinity of the main steam line in the drywell is introduced with steam into a suppression chamber of a wetwell through the suppression vent pipe, thus reducing a quantity of non-condensable gas to flow into the isolation condenser through the main steam line.

Further, when the drywell is succesively cooled by the isolation condenser, the pressure in the drywell is equal to or lower than that in the suppression chamber. When the pressure in the dry well becomes almost equal to that in the suppression chamber, the non-condensable gas vent pipe of the isolation condenser toward the suppression chamber is plugged by the suppression pool water and stops venting the non-condensable gas. Even in this case, the gas vent pipe toward the lower area of the drywell continues venting the non-condensable gas to the drywell.

When the pressure in the drywell decreases lower than that in the suppression chamber, the vacuum breaker opens and the non-condensable gas flows back to the drywell from the suppression chamber. Even in this case, the vent pipe of the vacuum breaker connects to the lower area of the drywell, the non-condensable gas is introduced to the lower area of the drywell from the suppression chamber, thus preventing an invasion of the introduced non-condensable gas into the isolation condenser.

The other objects and features of this invention will become understood from the following description with reference to the accompanying drawings.

BRIEF DESCRIPTION OF THE DRAWINGS

For a better understanding of this invention and to show how the same is carried out, reference is made, by way of preferred embodiment, to the accompanying drawings, in which.

DESCRIPTION OF THE PREFERRED EMBODIMENTS

Figure 1:
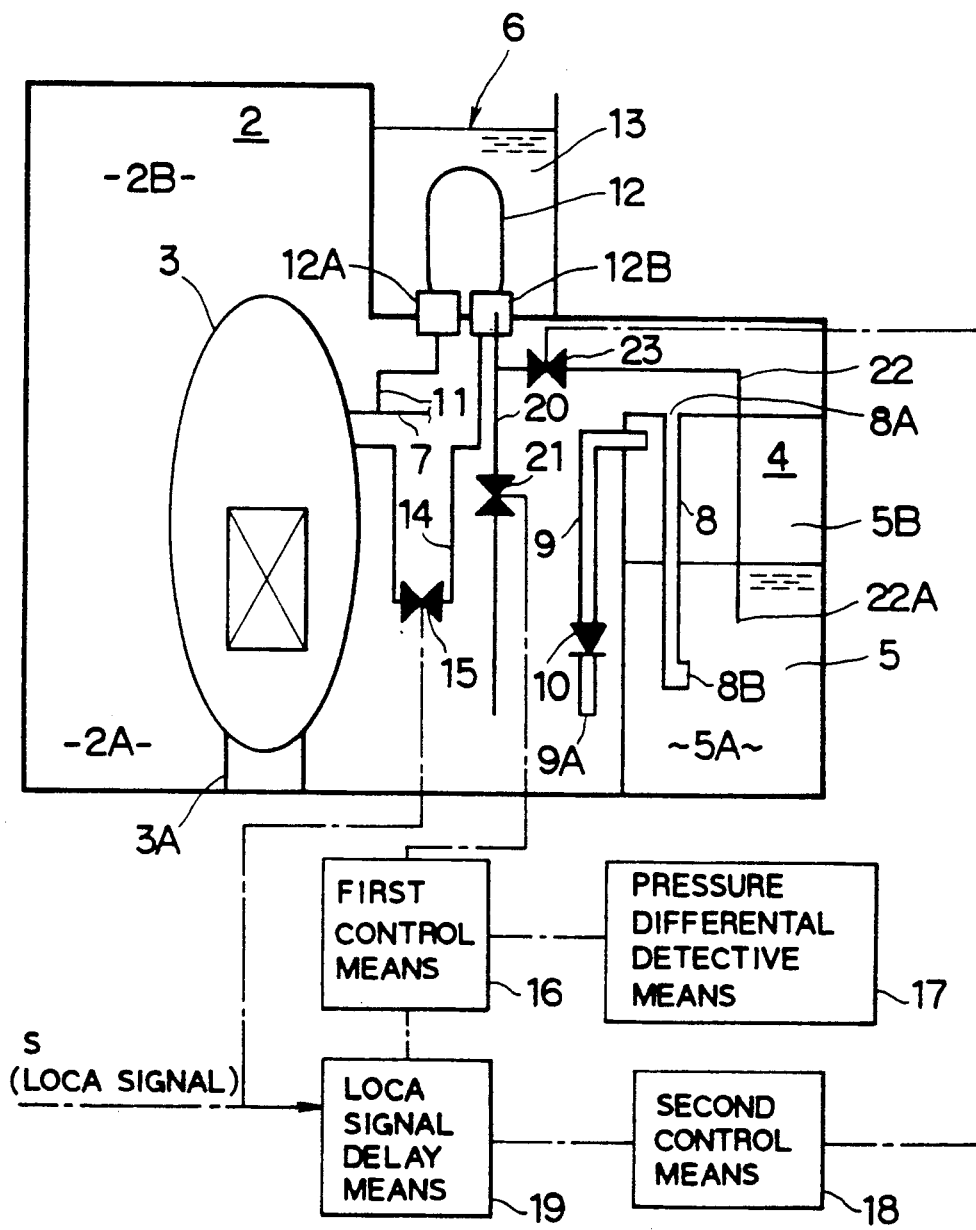
FIG. 1 is a schematic view showing an elevational section of a reactor containment vessel including a cooling system embodying a first embodiment according to the present invention.
Figure 2:
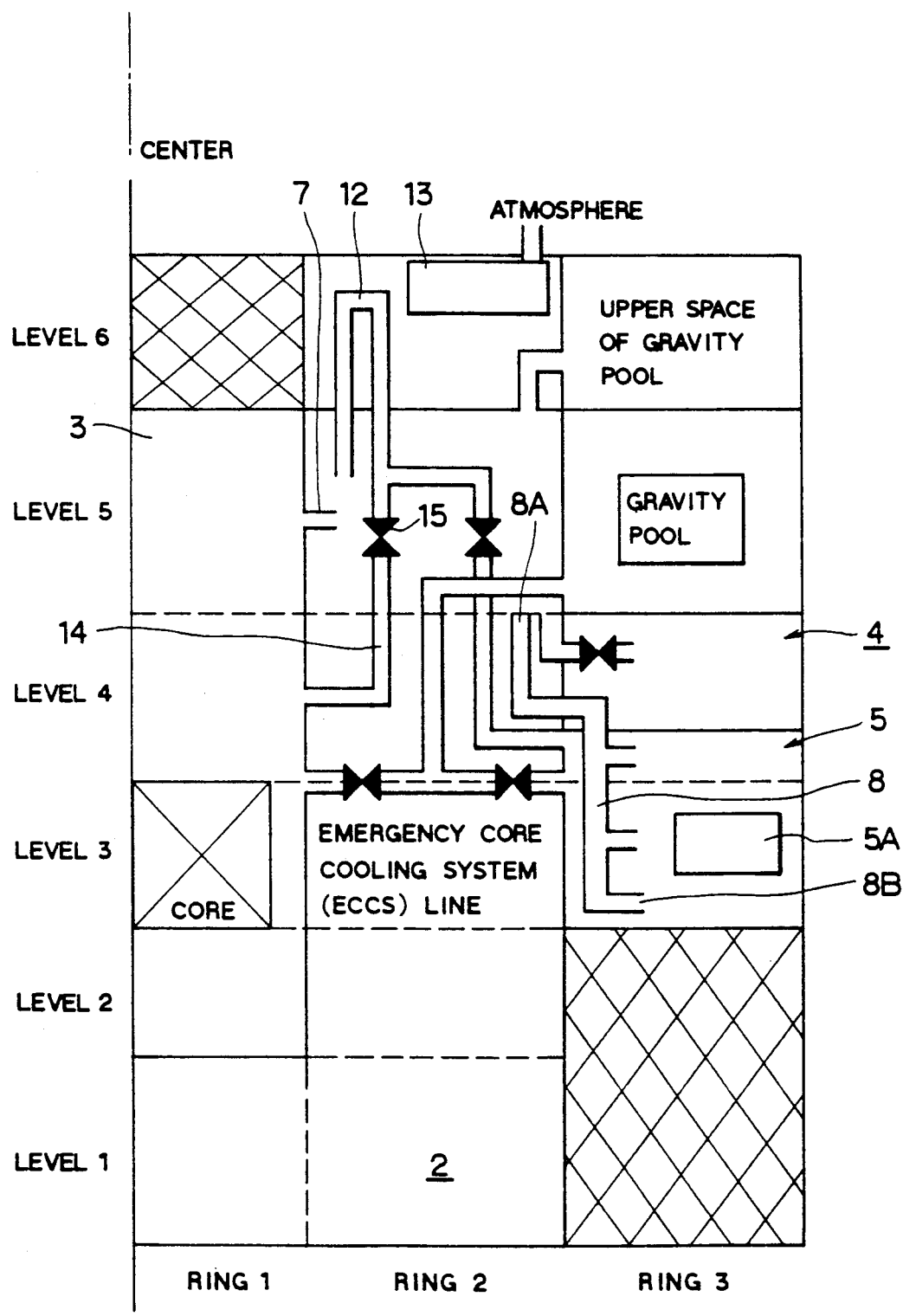
FIG. 2 is a schematic view showing an analysis noding by a Best Estimate Thermal-Hydraulic Code TRAC-BWR.
Figure 3:
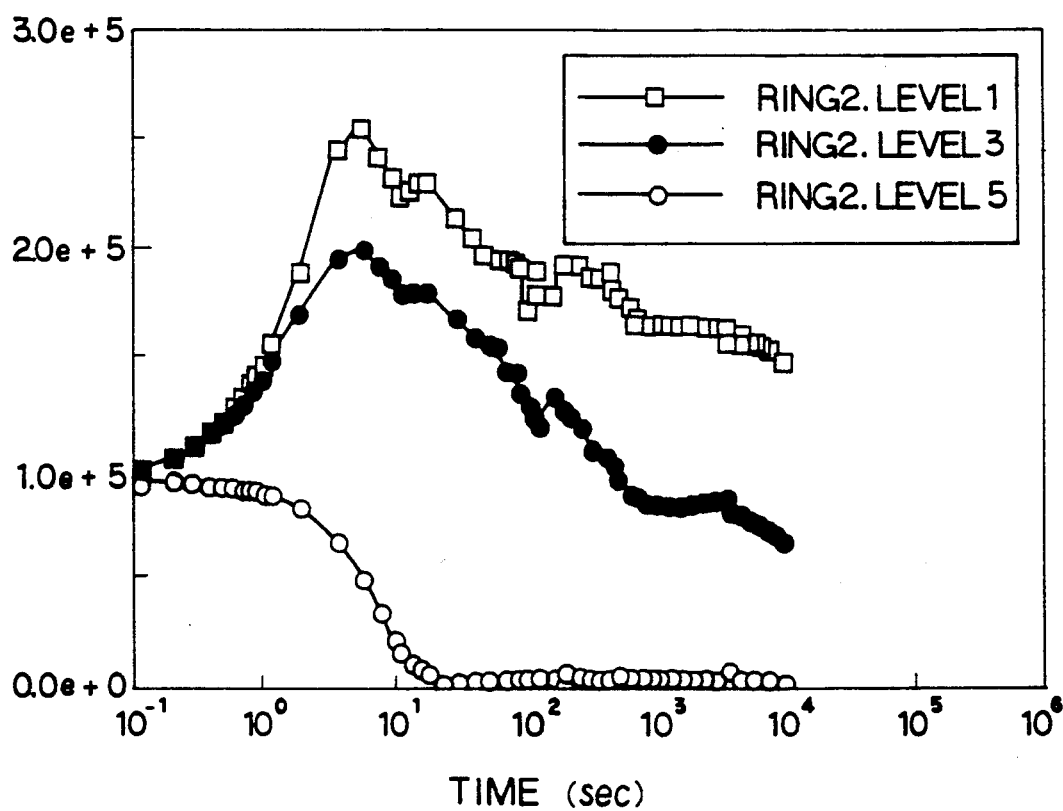
FIG. 3 is a distribution chart showing partial pressure of non-condensable gas in a drywell calculated by the Best Estimate Thermal-Hydraulic Code TRAC-BWR shown in FIG. 2.

Referring to FIGS. 1-3, a reactor containment vessel 1 of a nuclear power plant comprises a drywell 2 charged with non-condensable gas wherein a reactor pressure vessel 3 supported on a floor by a pedestal 3A is contained and a wetwell 4 having a suppression chamber 5. An isolation condenser (emergency condenser) 6 is provided on an upper side of the reactor containment vessel 1. The reactor pressure vessel 3 has a main steam line 7 extending outward therefrom.

The suppression chamber 5 is composed of a pool 5A and an air chamber 5B, and the suppression chamber 5 in which a suppression vent pipe 8 is provided is charged with pool water. The suppression vent pipe 8 is communicated with the drywell 2 at its one open end 8A and the other open end 8B is soaked in the pool 5A.

The one open end 8A of the suppression vent pipe 8 is positioned at the substantially identical level with the main steam line 7 (see FIG. 1). The substantially identical level, as shown in FIG. 2, means that the main steam line 7 and the one open end 8A are respecively positioned in a same node (see Ring 2 - Level 5 shown in FIG. 2).

The isolation condenser 6 is incorporated on the upper side of the reactor containment vessel 1. The isolation condenser 6 comprises a steam supply pipe 11 branched away and connected to the main steam line 7, a bundle of heat exchanger tubes 12 connected with the steam supply pipe 11, a condensate tank or pool 13 in which the heat exchanger tubes 12 are disposed, a return pipe 14 connecting between the heat exchanger tubes 12 and the reactor pressure vessel 3, a non-condensable gas vent pipe 22 connecting between an outlet portion 12B of the heat exchanger and the suppression chamber 4 and a first non-condensable gas vent pipe 20 connecting between the outlet portion 12B and a lower area 2A of the drywell 2. An open end of the non-condensable gas vent pipe 22 is submerged into the pool 5A to be positioned at a level upper than the other open end 8B of the suppression vent pipe 8.

The heat exchanger tubes 12 have respectively an inlet portion 12A and the outlet portion 12B at each end thereof. The heat exchanger tubes 12 which respectively communicates between the steam supply pipe 11 and return pipe 14 through the inlet portion 12A and outlet portion 12B are soaked in the water charged in the condensate tank 13 so as to condense the steam introduced from the main steam line 7. The return pipe 14 having a return valve 15 is connected with the reactor pressure vessel 3 to return the condensed water thereto. The return valve 15 is constantly closed or actuated to be opened in accordance with a signal transmitted in response to an occurance of LOCA (Loss of Coolant Accident).

The first non-condensable gas vent pipe 20 is provided in the isolation condenser 6. The first non-condensable gas vent pipe 20 is extended from and connected to the outlet portion 12B of the heat exchanger tubes 12. The first non-condensable gas pipe 20 having a first exhaust valve 21, and its open end 20A is opened at the lower area 2A of the drywell 2.

The branch pipe 22 is branched away and connected to the first non-condensable gas vent pipe 20 between the outlet portion 12B and the first exhaust valve 21. The branch pipe 22 has a second exhaust valve 23, and its open end 22A which is extended into the suppression chamber 5 is soaked into the pool 5A to be positioned at an upper level than the other open end 8B of the suppression vent pipe 8.

The first and second exhaust valves 21, 23, which are constantly closed to interrupt each communication in the first non-condensable gas vent pipe 20 and the branch pipe 22, are respectively actuated to be opened with a given time delay after a signal S responsive to LOCA has been transmitted and a pressure differential in the branch pipe 22. Of these first and second exhaust valves 21, 23, in their operative condition, the former communicates between the heat exchanger tubes 12 and the drywell 2 and the latter communicates between the heat exchanger tubes 12 and the suppression chamber 5.

The first exhaust valve 21 is operatively connected with a LOCA signal delay means 19 and a pressure differential detective means 17 through a first control means 16. The second exhaust valve 23 is operatively connected with a LOCA signal delay means 19 through a second control means 18. The second exhaust valve 23 is actuated to be opened by the second control means 18 in accordance with a signal transmitted from the LOCA signal delay means 19. The LOCA signal delay means 19 is provided to delay a LOCA signal S for a given time and to transmit a given time delay signal to the second control means 18.

The first exhaust valve 21 is actuated to be opened by the first control means 16 in accordance with the signal transmitted from the LOCA signal delay means 19 and a positive pressure differential in the end 22A of the non-condensable gas vent pipe (branch pipe) 22. The pressure detective means 17 is provided to detect pressure differential in the end 22A of the non-condensable gas vent pipe 22 and pressure differential becomes positive when the pool water 5A is flown into the open end 22A of the non-condensable gas vent pipe 22.

The occurrence of Loss of Coolant Accident invites a level of the coolant to lower in the reactor pressure vessel 3. When the level of the coolant lowers below a given value, a signal of coolant level is transmitted to the return valve 15, thereby actuating the return valve 15 to be opened.

A communication pipe 9 which is provided between the drywell 2 and the wetwell 4 has a vacuum breaker 10. The communication pipe 9 extends from the air chamber 5B of the suppression chamber 5 toward the drywell 2 to communicate therebetween via the vacuum breaker 10. An open end 9A of the communication pipe 9 is opened toward a lower area 2A of the drywell 2. The vacuum breaker 10 makes the communication pipe 9 constantly interrupt communication between the air chamber 5B and the drywell 2.

The vacuum breaker 10 is a check valve which automatically opens when the pressure in the drywell becomes lower than that in the suppression chamber 5.

The communication pipe 9, therefore, communicates between the air chamber 5B and the drywell 2 only when the pressure in the drywell 2 becomes lower than that in the air chamber 5B and the vacuum breaker 10 is actuated to be opened.

FIG. 2 illustrates a schematic view of a noding analysis by a best estimate thermal-hydraulic code TRAC-BWR in the above first embodiment. The analysis system in FIG. 2 indicates that the drywell 2 is divided into six nodes (Ring 1 - Level 1, Ring 2 - Levels 1–5). The analysis system also indicates that the main steam line 7 and the one open end 8A of the suppression vent pipe 8 are respecively positioned in the same node (Ring 2-Level 5), that is, at the substantially identical level as descibed previously.

The noding analysis by Best Estimate Thermal-Hydraulic Code TRAC-BWR is used as a method of analysis. In this analysis, a reactor containment vessel including a reactor pressure vessel is modeled as a cylindrical system (R-Z System) and such a cylindrical system is further divided into respective parts in area each called a cell. The noding analysis is to estimate hydraulic behavior in respective parts. In the analysis presented by FIG. 2, the cylindrical system is divided into six nodes called Level in its axial direction (Z) and into three nodes called Ring in the diametrical direction.

FIG. 3 illustrates a distribution chart showing partial pressure of non-condensable gas in the drywell 2 on the basis of the analysis system shown in FIG. 2 when the main steam line 7 is broken. It is apparently understood that the partial pressure of the non-condensable gas in the upper portion of the drywell 2 (Ring 2 - Level 5) rapidly decreases during about several tens of seconds after the breaking of the main steam line 7. This shows that a quantity of non-condensable gas reduces to almost zero in the above-described node defined by Ring 2 - Level 5 where the steam supply pipe 11 of the isolation condenser 6 is provided.

The following will describe an explanation of function relating to the first embodiment of this invention.

If it happens by any possibility that the main steam line 7 is broken, the steam is released from the reactor pressure vessel 3 into the drywell 2 through the broken main steam line 7 to be mixed with the non-condensable gas. The pressure in the drywell 2 becomes greater than that in the suppression chamber 5. Most of the mixture in the upper area 2B of the drywell 2 is introduced into the suppression chamber 5 through the suppression vent tube 8. Most of the non-condensable gas, which exists in the upper area 2B of the drywell 2 before the break, is removed in about tens of seconds after the break of the main steam line 7.

When the return valve 15 is opened for removing the decay heat, the steam in which most of the non-condensable gas has been removed is introduced into the heat exchanger tubes 12 of the isolation condenser 6 from the upper area 2B (see Node Ring 2 - Level 5 in FIG. 2) of the drywell 2 through the broken main steam line 7. At this time most of the non-condensable gas is removed from the steam in the upper area 2B of the drywell 2, so that it is possible to prevent the isolation condenser 6 from absorbing a large amount of non-condensable gas and to prevent the significant degradation of the condensation heat transfer in the heat exchanger tubes 12.

Even if the non-condensable gas is excluded from the upper area 2B, it is a fact that extremely a little non-condensable gas exists in the steam. If the non-condensable gas resides even extremely a little, there is a possibility that the non-condensable gas may go on to accumulate in the heat exchanger tubes 12 because of the removal of the steam by concentration therein, thus inviting the degradation of the condensation heat transfer in the heat exchanger tubes 12.

In this case, however, when the second valve 23 is opened by the second control means 18 for removing the decay heat, because the pressure in the drywell 2 is greater than that in the suppression chamber 5, the branch pipe 22 introduces the non-condensable gas with the steam in the heat exchanger tubes 12 into the suppression chamber 5. Accordingly, the non-condensable gas is adequately excluded from the heat exchanger tubes 12, thus preventing the accumulation of the non-condensable gas in the heat exchanger tubes 12 and enabling to obtain better cooling performance.

When the drywell 2 is succesively cooled by the isolation condenser 6 and the pressure in the drywell 2 is equal to the pressure in the suppression chamber 5, while water in the pool 5A is flown into the open end 22A of the branch pipe 22, the branch pipe 22 is sealed by water at its open end 22A. In this case, the first control valve 21 is opened by the first control means 16 and then the non-condensable gas in the heat exchanger tubes 12 is exhausted through not the branch pipe 22 but the first non-condensable gas vent pipe 20 so as to be introduced in the lower area 2A of the drywell 2. It is, therefore, possible to avoid the accumulation of the non-condesable gas in the heat exchanger tubes 12.

When the drywell 2 is further cooled by the isolation condenser 6 and the drywell 2 becomes lower in pressure, this causes the level of the pool 5A in the branch pipe 22 to rise, thus returning the non-condensable gas in the branch pipe 22 toward the side of the isolation condenser 6. The non-condensable gas in the branch pipe 22, however, is introduced to the drywell 2 through the first non-condensable gas vent pipe 20 in this case too.

When the drywell 2 is successively cooled by the isolation condenser 6, the pressure in the drywell 2 becomes lower than the pressure in the suppression chamber 5. Then the vacuum breaker 10 opens and the non-condensable gas in the suppression chamber 5 is returned to the lower area 2A of the drywell 2 through the communication pipe 9. At this time, because non-condensable gas is greater in density than steam, the returned non-condensable gas is suppressed to rise in the drywell 2 to reside in the lower area 2A of the drywell 2. The returned non-condensable gas, therefore, does not intrude from the lower area 2A of the drywell 2 into the isolation condenser 6.

Figure 4:
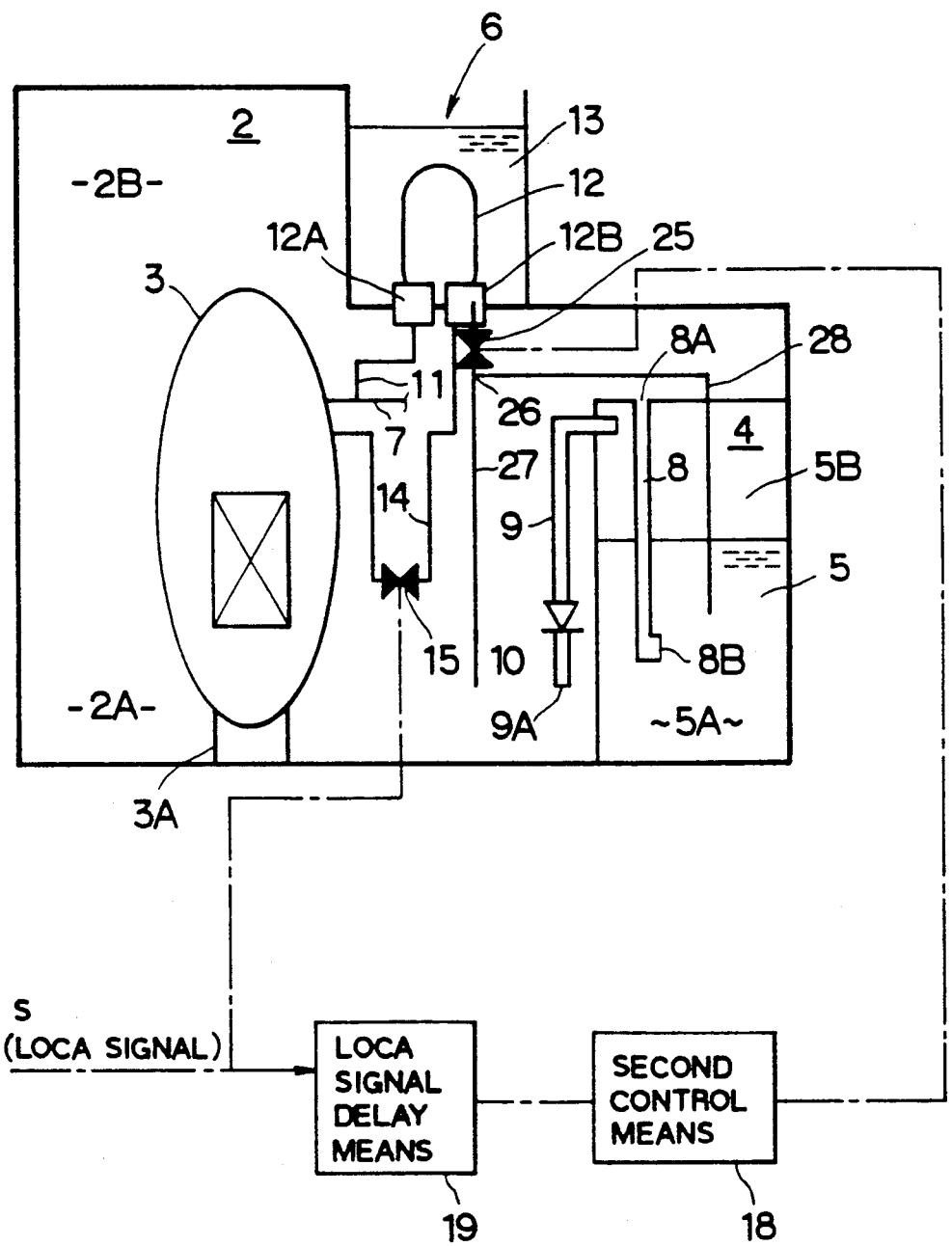
FIG. 4 is a schematic view showing an elevational section of a reactor containment vessel including a cooling system embodying a second embodiment according to the present invention.

FIG. 4 shows a second embodiment of a reactor containment vessel according to the present invention which is generally similar to the construction described above with reference to FIGS. 1 and 2, similar parts being coincident with the same reference numerals.

In this embodiment, the isolation condenser 6 has a third exhaust valve 25 which is equipped between the outlet portion 12B and the branching point 26, instead of the first and second exhaust valves 21, 23 in the first embodiment. A non-condensable gas vent pipe 27 toward the lower area 2A of the drywell 2 has a larger flow resistance than the flow path consisted of the steam supply line 11 and the heat exchanger tubes 12. The third exhaust valve 25, which is constantly closed to interrupt communications in the non-condensable gas vent pipes 27,28, is actuated to be opened with a given time delay after a signal S responsive to LOCA has been transmitted.

The following explanation will describe function of the second embodiment of this invention.

When the main steam line 7 is broken by any possibility, the steam is released from the reactor pressure vessel 3 into the drywell 2 through the broken main steam line 7 to be mixed with the non-condensable gas. Most of the non-condensable gas in the upper area 2B of the drywell 2 is introduced with the steam into the suppression chamber 5 through the suppression vent pipe 8.

When the exhaust valve 25 is opened by the second control means 18 and the pressure in the drywell 2 is higher than that in the suppression chamber 5, the non-condensable gas in the heat exchanger tubes 12 is vented to the suppression chamber 5 through the non-condensable gas vent pipe 28. Since the flow resistance of the non-condensable gas vent pipe 27 toward the lower area 2A of the drywell 2 is larger than that of the flow path consisted of the steam supply line 11 and the heat exchanger tube 12, the bypass flow from the lower area 2A of the drywell 2 to the suppression chamber 5 through the non-condensable gas vent pipes 27,28 is well limited, compared with the flow through the heat exchanger tubes 12 and the non-condensable gas vent pipe 28. Thus accumulation of the non-condensable gas in the heat exchanger tubes 12 is avoided.

When the drywell 2 is cooled further by the isolation condenser 6 and the pressure in the drywell 2 becomes almost equal to that in the suppression chamber 5, the exit of the non-condensable gas vent pipe 28 is sealed by the pool water 5A and stops venting the non-condensable gas. Even in this case, the non-condensable gas vent pipe 27 toward the lower area 2A of the drywell 2 vents the non-condensable gas.

Figure 5:
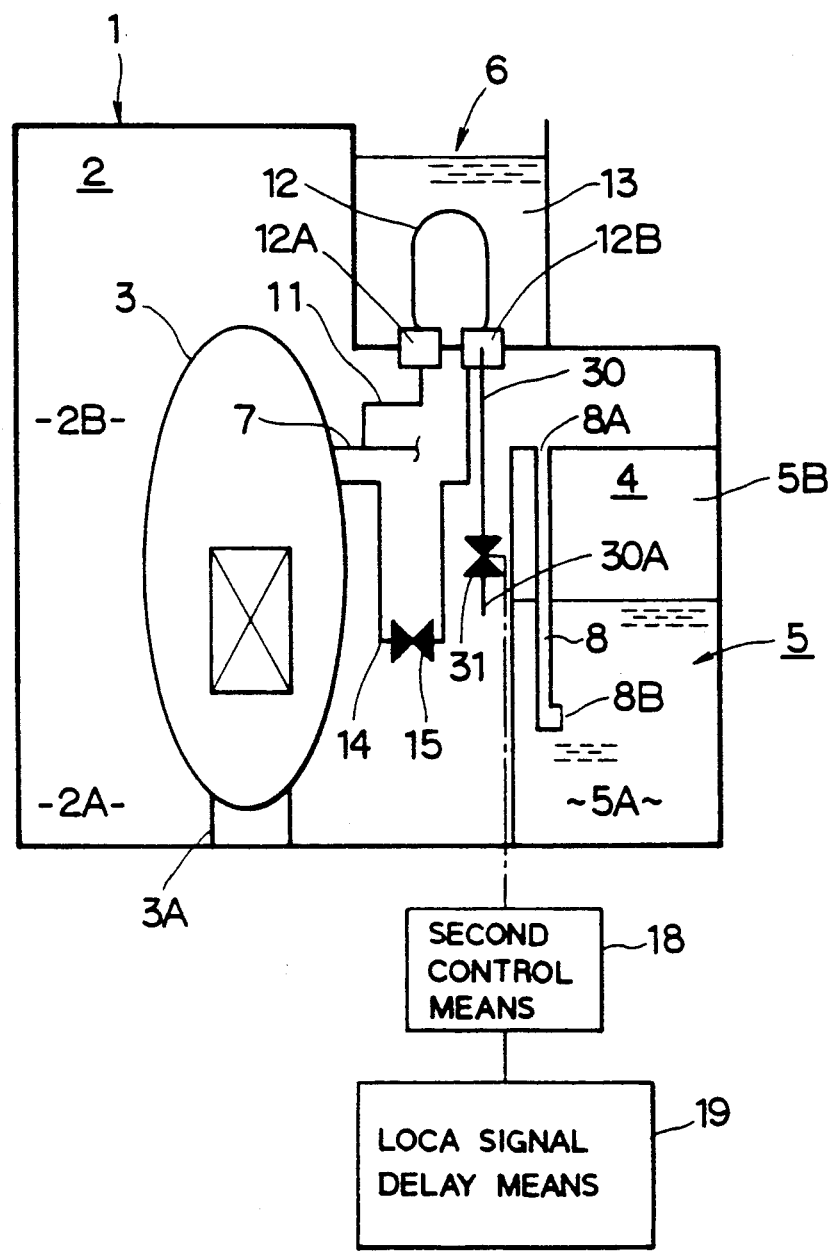
FIG. 5 is a schematic view showing an elevational section of a reactor containment vessel including a cooling system embodying a third embodiment according to the present invention.
Figure 6:
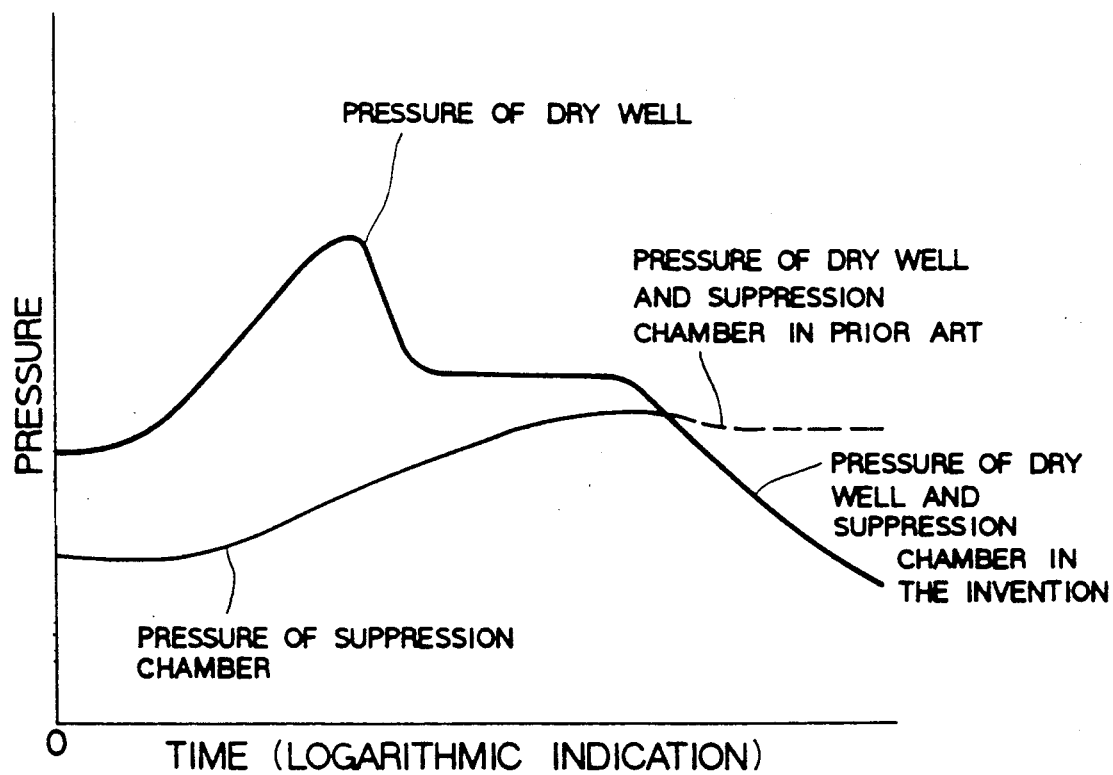
FIG. 6 is a characteristic diagram showing a functional difference between the present invention and the conventional art.

FIG. 5 shows a third embodiment of a reactor containment vessel according to the present invention which is generally similar to the construction described above with reference to FIGS. 1 to 4, similar parts being coincident with the same reference numerals.

In this embodiment, the isolation condenser 6 has a second non-condensable gas vent pipe 30 which is extended from and connected with the outlet portion 12B of the heat exchanger tubes 12. The second non-condensable gas vent pipe 30 has a fourth exhaust valve 31, and its open end 30A is opened at the lower area 2A of the drywell 2.

The fourth exhaust valve 31, which is constantly closed to interrupt a communication in the third non-condensable vent pipe 30, is actuated to be opened with a given time delay after a signal S responsive to LOCA has been transmitted. In an operative condition of the fourth exhaust valve 31, the second non-condensable gas vent pipe 30 communicates between the heat exchanger tubes 12 and the drywell 2.

The fourth exhaust valve 31 is operatively connected with a LOCA signal delay means 19 through the second control means 18. The fourth exhaust valve 31 is actuated to be opened by the second control means 18 in accordance with the signal transmitted from the LOCA signal delay means 19.

In the case of the breaking of the main steam line 7, when the isolation condenser 6 is actuated by opening of the return valve 15 and further cooling water is sufficiently supplied into the reactor pressure vessel 3, the pressure differential between the drywell 2 and suppression chamber 5 becomes less in accordance with a decrease of the steam released to the drywell 2. The non-condensable gas introduced in the heat exchanger tubes 12 is exhausted through the second non-condensable gas vent pipe 30 and introduced to the lower area 2A of the drywell 2.

It should be understood that the present invention is not limited to the preferred embodiment described above and many other modifications and changes may be made without departing from the scope of the appended claim.

What is claimed is:

1. A reactor containment vessel composed of a wetwell and a drywell in which a cooling system is provided comprising:

a reactor pressure vessel included in the drywell with a main steam line extending outward therefrom, the drywell having an inner space divided by vertical upper and lower areas and charged with a non-condensable gas;

an emergency condenser connected to the main steam line and provided at a level substantially corresponding to the upper area of the drywell, said emergency condenser including a heat exchanger means for condensing steam introduced therein;

a suppression chamber provided in the wetwell and defined by an air chamber and a pool in which pool water is charged;

a suppression vent line provided in the suppression chamber, having one open end opened to the drywell and another open end soaked into the pool, said one open end being positioned at a level substantially corresponding to the upper area in the drywell where the main steam line is disposed so as to communicate between the drywell and suppression chamber; and a communication line vertically extending in the drywell for guiding the non-condensable gas to the lower area of the drywell.

2. A reactor containment vessel according to claim 1, wherein said communication line comprises a first communication pipe means communicated with the suppression chamber and provided with a first valve means and a second communication pipe means communicated with the heat exchanger means and provided with a second valve means.

3. A reactor containment vessel according to claim 2, wherein said first communication pipe means has one end opened to the air chamber of the suppression chamber and another end opened at the lower area of the drywell and said first valve means is selectively opened or closed in accordance with a pressure difference between the drywell and the air chamber of the suppression chamber.

4. A reactor containment vessel according to claim 3, wherein said first valve means is a vacuum breaker which is actuated to be opened when the drywell is lower in pressure than the suppression chamber.

5. A reactor containment vessel according to claim 2, wherein said second communication pipe means has one end opened to the heat exchanger means and another end opened at the lower area of the drywell and said second communication pipe means includes a control means for controlling a degree of opening of said second valve means in accordance with a loss of coolant accident.

6. A reactor containment vessel according to claim 5, wherein said second valve means comprises an exhaust valve.

7. A reactor containment vessel according to claim 5, wherein said second communication pipe means is provided with a branch pipe having a branched one end and another end extending in the pool of the suppression chamber and being opened there.

8. A reactor containment vessel according to claim 7, wherein said branch pipe is provided with a third valve means comprising an exhaust valve.

9. A reactor containment vessel according to claim 7, wherein said second valve means is provided for the second communication pipe means at an upstream side of the branched one end of the branch pipe.

10. A reactor containment vessel according to claim 7, wherein said another end of the branch pipe is positioned at a level upper than a level of said another open end the suppression vent line.

* * * * *